United States Patent [19]

Gallagher et al.

[11] Patent Number: 6,115,714
[45] Date of Patent: Sep. 5, 2000

[54] TRIGGERING MECHANISM FOR MULTI-DIMENSIONAL DATABASES

[75] Inventors: Mary Clara Gallagher, Brookline, Mass.; Brian James McGill, Tucson, Ariz.; Alan David Kropp, San Francisco, Calif.

[73] Assignee: Kenan Systems Corp., Cambridge, Mass.

[21] Appl. No.: 09/045,433

[22] Filed: Mar. 20, 1998

[51] Int. Cl.[7] ................................................. G06F 17/30
[52] U.S. Cl. ................................................................ 707/100
[58] Field of Search ........................... 707/1–3, 100–104, 707/200–201, 503, 504; 395/701–705

[56] References Cited

U.S. PATENT DOCUMENTS

| | | | |
|---|---|---|---|
| 5,062,039 | 10/1991 | Brown et al. | 364/200 |
| 5,255,305 | 10/1993 | Sattar | 379/34 |
| 5,261,094 | 11/1993 | Everson et al. | 395/600 |
| 5,319,777 | 6/1994 | Perez | 395/600 |
| 5,359,724 | 10/1994 | Earle | 707/205 |
| 5,418,898 | 5/1995 | Zand et al. | 395/137 |
| 5,423,043 | 6/1995 | Fitzpatrick et al. | 395/700 |
| 5,428,712 | 6/1995 | Elad et al. | 706/46 |
| 5,519,861 | 5/1996 | Ryu et al. | 395/600 |
| 5,546,576 | 8/1996 | Cochrane et al. | 395/600 |
| 5,559,940 | 9/1996 | Hutson | 395/151 |
| 5,592,664 | 1/1997 | Starkey | 395/600 |
| 5,592,666 | 1/1997 | Perez | 395/600 |
| 5,742,810 | 4/1998 | Ng et al. | 707/4 |
| 5,862,378 | 1/1999 | Wang et al. | 395/701 |
| 5,918,232 | 6/1999 | Pouschine et al. | 707/103 |
| 5,926,819 | 7/1999 | Doo et al. | 707/104 |
| 6,003,040 | 12/1999 | Mital et al. | 707/103 |

OTHER PUBLICATIONS

Oracle: The Complete Reference, Version 7.2, 1995, Koch et al., Oracle Press, Chapter 21–22, Dec. 1995.

*Primary Examiner*—Hosain T. Alam

[57] ABSTRACT

A method for invoking an action on a multi-dimensional database includes associating a procedure with a plurality of cells and invoking the procedure when at least one cell in the plurality is accessed. The method may be embodied on an article of manufacture.

17 Claims, 1 Drawing Sheet

TRIGGERING MECHANISM FOR MULTI-DIMENSIONAL DATABASES

FIELD OF THE INVENTION

The present invention relates to multi-dimensional databases and, in particular, to triggering mechanisms for multi-dimensional databases.

BACKGROUND OF THE INVENTION

The information industry has witnessed a steady evolution in database power and flexibility. From flat file and hierarchical to relational and distributed relational technologies, data structures have evolved to match more closely the way users visualize and work with data.

The latest step in the evolution of databases is the multi-dimensional database. Multi-dimensional databases have matured into the database engine of choice for data analysis applications. This application category is widely recognized today as OLAP (On Line Analytical Processing). Multi-dimensional databases facilitate flexible, high performance access and analysis of large volumes of complex and inter-related data, even when that data spans several applications in different parts of an organization.

Aside from its inherent ability to integrate and analyze large volumes of enterprise data, the multi-dimensional database offers a good conceptual fit with the way end-users visualize business data. For example, a monthly Profit and Loss (P&L) statement with its row and column format is an example of a simple two-dimensional data structure. A three-dimensional data structure might be a stack of these P&L worksheets: one for each month of the year. With the added third dimension, end-users can more easily examine P&L items across time for trends. Insights into business operations can be gleaned and powerful analysis tools such as forecasting and statistics can be applied to examine relationships and project future opportunities.

Multi-dimensional databases allow information to be arranged hierarchically. Lower levels in the hierarchy tend to have greater amounts of detail than higher levels. For example, data may be grouped into four categories: country, region, state, and city. Database records at the city level contain the most detailed information while database records at the country level generally have the least detailed information. "Rolling up" is defined as the consolidation of lower-level data to increasingly higher, more summary, levels of data. One drawback of this structure is that, as data is rolled up, detail can be lost and incorrect data may be retrieved in response to a query at a summary level.

One useful feature of flat file and relational databases is the ability to associate a stored procedure with a data cell. The procedure is invoked, or "triggered," when that data cell is accessed. However, because individual data cells in a multi-dimensional data structure typically are not directly manipulated, provision of a triggering function is not straight forward.

SUMMARY OF THE INVENTION

The present invention relates to a triggering mechanism for multi-dimensional databases which allows stored procedures associated with an array to be invoked when certain accesses are made to cells in that array. An array is a group of data cells sharing a common set of dimensions.

In one aspect, the present invention relates to a method for invoking a database action which includes the steps of associating a stored procedure with a plurality of cells of a multi-dimensional database and invoking the procedure when at least one of the plurality of cells of the multi-dimensional data structure is accessed.

In another aspect, the present invention relates to an article of manufacture having computer readable program means embodied thereon for invoking a database action in a multi-dimensional data structure. The article includes computer readable program means for associating a stored procedure with a plurality of cells of a multi-dimensional data structure and computer readable program means for invoking the procedure when a plurality of cells of the multi-dimensional database are accessed.

BRIEF DESCRIPTION OF THE DRAWING

The invention is pointed out with particularity in the appended claims. The advantages of the invention described above, as well as further advantages, may be better understood by reference to the following description taken in conjunction with the accompanying drawings, in which:

DETAILED DESCRIPTION OF THE INVENTION

Figure 1:
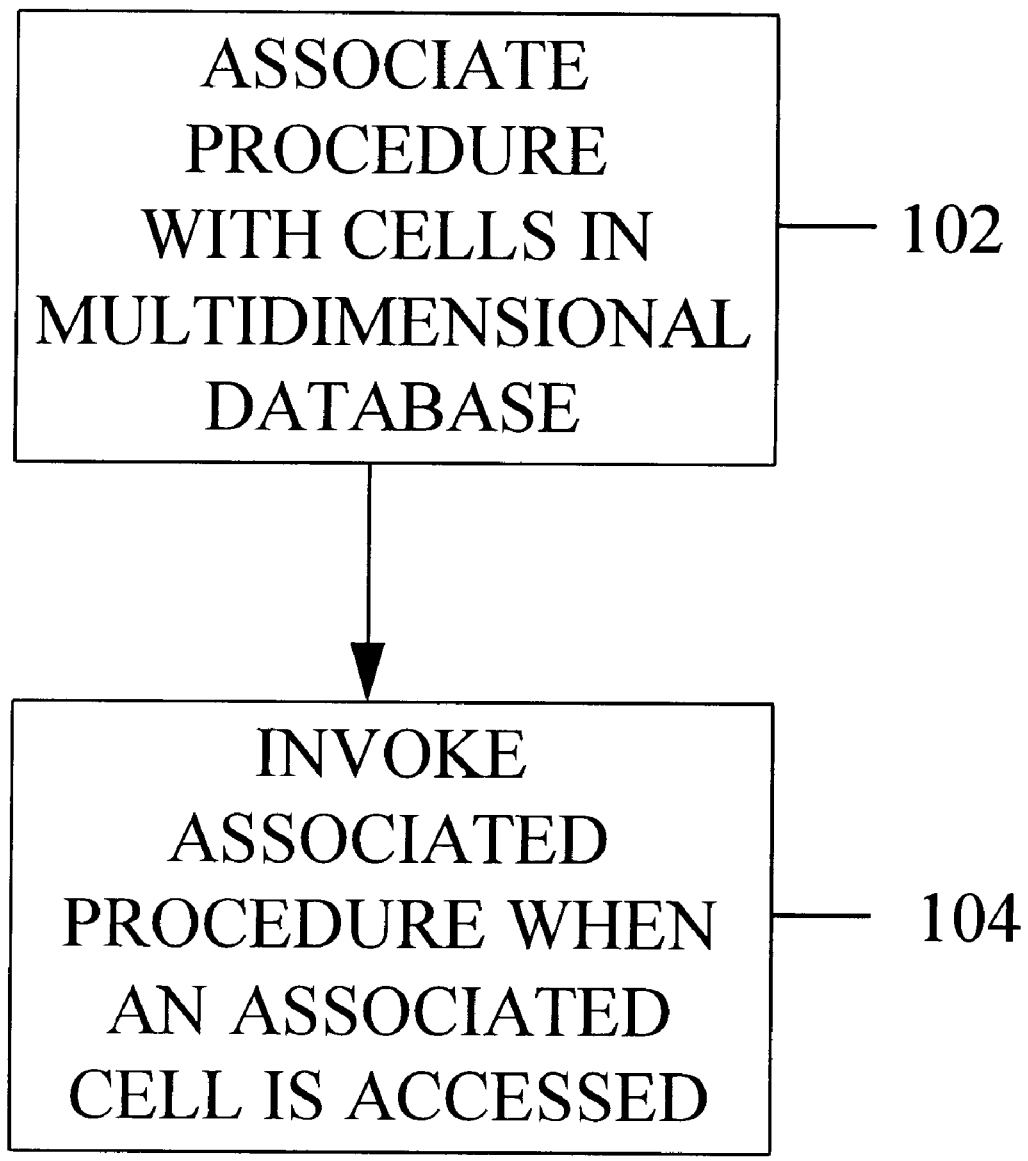
FIG. 1 is a flow chart of the steps to be taken to invoke a database action in multidimensional data structure.

Referring now to FIG. 1, a method for invoking a database action in a multi-dimensional data structure includes the steps of associating a procedure with a plurality of cells in the database (step 102) and invoking the associated procedure when at least one of the plurality of cells is accessed (step 104).

An associated procedure is a series of commands in the database language that instruct the database to take one or more actions. A stored procedure is associated with a multi-dimensional data structure. In some embodiments, the procedure is only invoked on certain types of accesses, for example, read, write, or load. Procedures identified as associated with a multi-dimensional data structure will be referred to as attached to an array; an array with an attached trigger will be referred to as the target array for the trigger procedure.

Each array can contain a header that has information about the array, including an identifier of an associated procedure. The identifier can be a pointer which identifies an address in storage at which the procedure begins.

A READ trigger procedure executes before the target array is read. A LOAD trigger procedure executes on the initial access of an array following connection to a database; the procedure executes after the array is loaded but before it is accessed. WRITE trigger procedures may be either AFTER_WRITE or BEFORE_WRITE. An AFTER_WRITE trigger procedure executes immediately after the target array has been updated. A BEFORE_WRITE trigger procedure executes before the target array is updated with new information.

Since commands must access the header of an array, each command can check the header to determine if a procedure is associated with the array. If one is, the procedure can be invoked.

A trigger procedure creates an alias for the target array. It uses the alias, which is simply another name for the target array, throughout the rest of the procedure. By using an alias instead of the target array's actual name, one trigger procedure can be attached to several arrays. That is, a trigger procedure does not have to include the names of any of the arrays to which it is attached. On the other hand, each target array must have the names of its trigger procedures associated with it, for example, stored in the array header.

Associating trigger procedures with arrays includes further steps of writing the trigger procedure and attaching it to the target array.

Writing Trigger Procedures

Trigger procedures are written just like other procedures, except that the only argument they may receive is one that creates an alias to refer to the target array. For example, a READ trigger, requires an alias that will refer to the array that is being read.

To create an alias, a command may be provided that is used from within the trigger procedure. For example, the first instruction in a trigger procedure might be: get myalias TRIGGER. In another embodiment, each procedure may include a hard-coded keyword for array aliases.

In the embodiment just described, the "get" command creates an alias named myalias. The created alias for of the target array looks and behaves like the array itself.

An alias array should look like the target array, respecting any ranges or subscripts in effect. Changes made to the alias array should cause the same changes to be made to the target array. Trigger procedures can use an alias just as it would use the target array, except that trigger procedures cannot change the target array's shape by updating the alias' header.

A procedure does not necessarily need to provide a command of the sort described above to operate as a trigger procedure. A trigger procedure could be written that contains the name of its target array. However, this prohibits the procedure from being attached to more than one target array, and would not respect the target array's current ranges or subscripts.

For example, an array containing numeric status codes could have a requirement that every cell must have a defined value, the default being a status code of 10. A trigger procedure could be written to change undefined cell values to 10 every time the array is the target of a write operation. An AFTER_WRITE trigger procedure for that purpose could appear as follows:

get myalias TRIGGER;

update FILL OVERLAYNA myalias with 10.

Attaching Trigger Procedures to Target Arrays

A trigger procedure may be attached to a specific array by adding the name of the procedure to the array's header information.

For example, a trigger procedure named TRIGGER_PROC that should be executed every time the array MYARRAY is read could be added to MYARRAY's header information with a command. For example:

update myarray (HDR: READ_TRIGGER) with trigger_proc;

The next time the array MYARRAY is read, the procedure named TRIGGER_PROC will execute first.

Detaching a Trigger Procedure from a Target Array

To detach a trigger procedure from an array, you would use the following command:

update myarray (HDR: READ_TRIGGER) with NA.

An associated procedure cannot change the "shape" of a target array, e.g., the associated procedure cannot permanently remove one dimension of a multi-dimensional data structure. When an alias is obtained, it has a range identical to the range (or subscripting) that the triggering command placed on the array. For example, the command "UPDATE fill myarray (time: 96 mar) with 100" would result in an invoked procedure obtaining an alias having a time range of 96 mar. The initial range, however, can be overridden with the procedure. Thus, a procedure could affect a single cell of multi-dimensional data structure even though its invocation specified a range of cells.

The present invention may be provided as one or more computer-readable program means embodied on or in one or more articles of manufacture. The article of manufacture may be a floppy disk, a hard disk, a CD ROM, a flash memory card, a PROM, a RAM, a ROM, or a magnetic tape. In general, the computer-readable programs may be implemented in any programming language. It is preferred that a high level language be used such as LISP, PERL, C, C++, or PROLOG. The software programs may be stored on or in one or more articles of manufacture as object code.

Having described certain embodiments of the invention it will now become apparent to one of skill in the art that other embodiments incorporating the concepts of the invention may be used. Therefore, the inventions should not be limited to certain embodiments but rather should only be limited by the spirit and scope of the following claims.

What is claimed is:

1. In a multi-dimensional database comprised of a plurality of dimensions of data, a method for invoking a database action, the method comprising:

(a) associating a procedure with a plurality of cells of the multi-dimensional database the plurality of cells defining an array, the array operative to store array cell data and an indicator of the procedure to be invoked when at least one of the plurality of cells of the array is accessed; and (b) invoking the procedure when at least one of the plurality of cells of the array of the multi-dimensional database is accessed, the procedure operative to perform a database action on the multi-dimensional database.

2. The method of claim 1 wherein step (a) comprises associating a procedure with a plurality of cells of the multi-dimensional database, the procedure receiving as an argument an identifier of a first array on which the procedure acts.

3. The method of claim 1 wherein step (a) comprises associating with a plurality of cells a procedure identifier, the procedure identifier indicating an initial array which the procedure targets.

4. The method of claim 1 further comprising the step of (c) associating with the plurality of cells an operation type which must be performed on the array to invoke the procedure.

5. The method of claim 4 wherein step (c) comprises associating with the plurality of cells an indication that a read operation must be performed on the array to invoke the procedure.

6. The method of claim 4 wherein step (c) comprises associating with the plurality of cells an indication that a load operation must be performed on the array to invoke the procedure.

7. The method of claim 4 wherein step (c) comprises associating with the plurality of cells an indication that the procedure should be invoked before a write operation is performed on the array.

8. The method of claim 4 wherein step (c) comprises associating with the plurality of cells an indication that the procedure should be invoked after a write operation is performed on the array.

9. A computer-readable medium encoded with a multi-dimensional database element array structure supporting invocation of a procedure when one or more cells of the array is accessed, said structure comprising:

an information portion stored in a storage element of the multi-dimensional database for storing array cell data; and a header portion stored in a storage element of the multi-dimensional database, said header portion storing an indication of a procedure to be invoked when at least one cell in the array is accessed, the procedure operative to perform a database action on the multi-dimensional database.

10. The computer-readable medium encoded with a multi-dimensional database structure of claim 9 wherein said header portion also stores an indication of a type of access that invokes the procedure.

11. The computer-readable medium encoded with a multi-dimensional database structure of claim 9 wherein said header portion stores a plurality of indicators, each of said plurality of indicators storing an indication of a procedure to be invoked when at least one cell in the array is accessed.

12. An article of manufacture having a computer-readable programs means embodied thereon for invoking an action in a multi-dimensional database comprised of a plurality of dimensions of data, the article of manufacture comprising:

computer-readable program means for associating a procedure with a plurality of cells of the multi-dimensional database, the plurality of cells defining an array, the array operative to store array cell data and an indicator of the procedure to be invoked when at least one of the plurality of cells of the array is accessed; and computer-readable program means for invoking the procedure when the array of the multi-dimensional database is accessed, the procedure operative to perform a database action on the multi-dimensional database.

13. The article of manufacture of claim 12 further comprising computer-readable program means for associating with the plurality of cells an operation type which must be performed on the array to invoke the procedure.

14. The article of manufacture of claim 13 further comprising computer-readable program means for associating with the plurality of cells an indication that a load operation must be performed on the array to invoke the procedure.

15. The article of manufacture of claim 13 further comprising computer-readable program means for associating with the plurality of cells an indication that a read operation must be performed on the array to invoke the procedure.

16. The article of manufacture of claim 13 further comprising computer-readable program means for associating with the plurality of cells an indication that a write operation must be performed on the array to invoke the procedure.

17. The article of manufacture of claim 13 further comprising computer-readable program means for associating with the plurality of cells an indication that the procedure should be invoked after a write operation is performed on the array.

* * * * *